Figure 1:
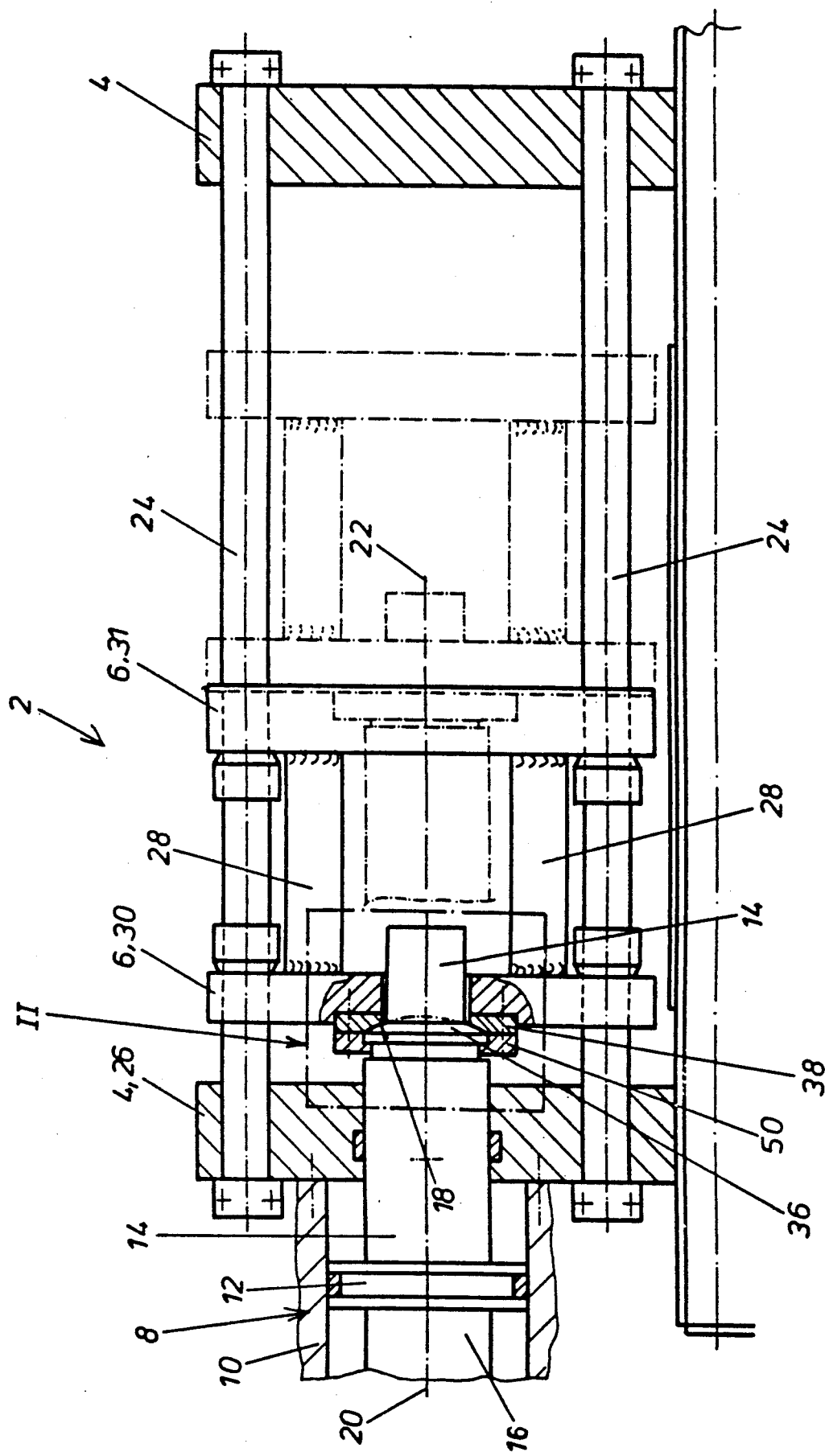

United States Patent [19]

Dennehl et al.

[11] Patent Number: 5,217,733
[45] Date of Patent: Jun. 8, 1993

[54] DEVICE FOR AN INJECTION MOULD

[75] Inventors: Friedrich-Wilhelm Dennehl, Hagen; Werner Reihelt, Bochum; Walter Runkel, Wuppertal, all of Fed. Rep. of Germany

[73] Assignee: Hermann Hemscheidt Maschinenfabrik GmbH & Co., Wuppertal, Fed. Rep. of Germany

[21] Appl. No.: 852,068

[22] Filed: Mar. 16, 1992

[30] Foreign Application Priority Data

Mar. 18, 1991 [DE] Fed. Rep. of Germany ....... 4108749

[51] Int. Cl.$^5$ ................................. A23P 1/00
[52] U.S. Cl. ................................. 425/589; 425/450.1; 100/214
[58] Field of Search ............... 425/450.1, 450, 451.9, 425/589, 595; 100/214

[56] References Cited

U.S. PATENT DOCUMENTS

| 4,080,144 | 3/1978 | Hehl | 425/451.9 |
| 4,273,524 | 6/1981 | Smith | 425/589 |
| 4,530,655 | 7/1985 | Hehl | 425/589 |

FOREIGN PATENT DOCUMENTS 9013791 1/1991 Fed. Rep. of Germany .

Primary Examiner—Bernard Nozick
Attorney, Agent, or Firm—Keck, Mahin & Cate

[57] ABSTRACT

A device for closing an injection mould and comprising a first, stationary mould-part holder, a second mould-part holder movably guided relative to the first holder, and at least one pressure medium-actuated closing cylinder arrangement connected to the mould-part holders, wherein the closing-cylinder arrangement is pivotably connected at least to the movably guided second mould-part carrier.

4 Claims, 2 Drawing Sheets

DEVICE FOR AN INJECTION MOULD

The invention relates to a device for closing an injection mould and comprising a first, stationary mould-part holder, a second mould-part holder movably guided relative to the first holder, and at least one pressure medium-actuated closing-cylinder arrangement connected to the mould-part holders.

A closing device of this kind is known from DE-GM 90 13 791. The closing device has given mainly good results; as a result of its construction it can generate an extremely high closing force. In practice, however, there have been some problems in opening and closing the mould, i.e. loud noise (vibration), probably caused by friction, in the region of the guides of the movable mould-part holder. It has also been observed in some cases that, during the closing of the mould, there is a change in the relative arrangement of the parts of the mould secured by the holders so that, when the mould closes, the very high closing forces damage the alignment pins which are disposed on the mould parts and engage in corresponding holes on the other part so as to guide the parts together into the correct position. As a result the mould becomes unserviceable and has to be repaired.

The aim of the invention is to improve the known closing device according to the preamble so that the aforementioned problems can be eliminated, i.e. so that improved operation and a longer working life are ensured.

To this end, according to the invention, the closing-cylinder arrangement is pivotably connected at least to the movably guided second mould-part carrier.

The invention is based on the discovery that the aforementioned problems occur when inaccuracies and tolerances during manufacture result in lack of parallelism or alignment between the axes of motion of the closing-cylinder arrangement on the one hand and the movable mould-part holder on the other hand. As a result of the special construction of the closing-cylinder arrangement, in which the closing piston is connected to two piston rods axially guided in opposite directions out of the cylinder, the rods being guided on separate rings, the closing piston is guided much more "stiffly" than the mould-part holder-which is rigidly connected to the closing piston via one of the piston rods and is in the form of a carrier plate-so that the piston guidance predominates over the guidance of the mould-part holder. The result is that, when the axes of motion of the mould-part holders are out of parallel, they are automatically moved into the axis of motion of the closing-cylinder arrangement, resulting in the problems previously described. This also results in severe wear in the region of the guides of the mould-part holder.

According to the invention, the pivotable, tiltable connection between the closing-cylinder arrangement and the movable mould-part guide "uncouples" the guides of the closing-cylinder arrangement on the mould-part carrier so that faults in alignment or lack of parallelism between the axes of motion can be automatically compensated. As a result of the invention, therefore, there can be no interaction between the guides of the closing-cylinder arrangement or the closing piston on the one hand and the mould-part carrier on the other hand. Advantageously according to the invention, the movable mould-part holder is independently guided so that it cannot tilt. Preferably, to this end, the movable mould-part holder is made up of two parallel carrier plates disposed transversely, more particularly at right angles, to the axis of motion and rigidly interconnected and formed with aligned openings by means of which they are guided on parallel rods. As a result of this inventive feature, the guides or guide openings are relatively far apart in the direction of the axis of motion so that the movable mould-part holder is guided without tilting, an improvement on the initially-described prior art.

Other advantageous features of the invention are disclosed in the sub-claims and the description hereinafter.

Figure 2:
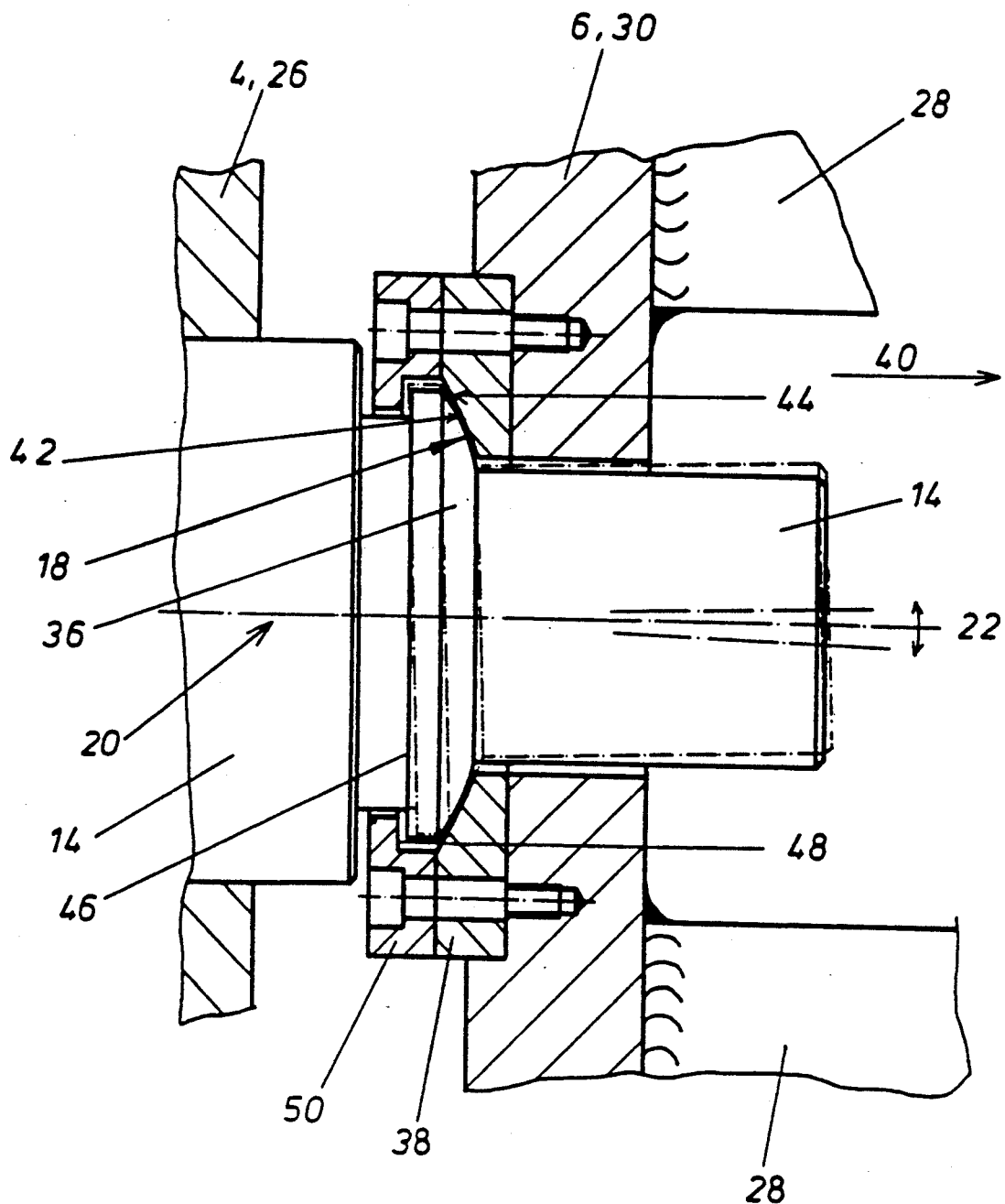

The invention will be described in detail with reference to a preferred embodiment shown in the drawings, in which:

FIG. 1 is a side view, partly in section, of a closing device according to the invention, and FIG. 2 is a larger-scale view of a detail marked II in FIG. 1.

In FIG. 1, a closing device 2 according to the invention comprises a first, stationary mould-part holder 4, a second mould part holder 6, movably guided relative to the first holder, and at least one pressure-medium actuated, more particularly hydraulic, closing-cylinder arrangement 8 connected to the mould part holders 4 and 6. The mould part holders 4, 6 are adapted to secure parts or halves (not shown) of an injection mould in the correct position relative to one another. The closing-cylinder arrangement 8 comprises a cylinder 10 and a pressure-medium actuated closing piston 12 movably guided therein and connected to a piston rod 14 which is guided outwards from the cylinder 10 in sealing-tight manner. The closing piston 12 can also be connected to a second piston rod 16 opposite the first piston rod 14. Both piston rods 14, 16 are guided on guides (not shown) in the cylinder 10, and this results in a very "stiff" guide so that the closing piston 12 in conjunction with the piston-rods 14, 16 can absorb very high transverse forces owing to the widely spaced-apart guides in the axial direction.

In the preferred embodiment of the invention as shown, the cylinder 10 is mounted in a stationary position and therefore indirectly connected to the first, stationary mould-part holder 4, whereas the second, movably guided mould-part holder 6 is connected to the closing piston 12 by the piston-rod 14. In principle, however, a kinematic reversal of this preferred embodiment is likewise within the scope of the invention.

According to the invention, the closing-cylinder arrangement 8 is pivotably connected to the movably-guided second mould-part holder 6. To this end, in the preferred embodiment, the piston-rod 14 is connected to the movably-guided mould-part carrier 6 by a joint 18. Advantageously by means of the joint 18, the axis of motion 20 of the closing-cylinder arrangement 8 can be completely out of parallel with the axis of motion 22 of the movable mould-part holder 6, i.e. the two can be at an acute angle to one another, without influencing the guides of the closing-cylinder arrangement 8 and of the mould-part holder 6.

As also shown in FIG. 1, the movable mould-part holder 6 is guided substantially without tilting on preferably four rods 24 which are parallel to one another and to the axis of motion 22. Advantageously also, the guide rods 24 connect the stationary mould-part carrier 4 to a cylinder cover 26 of the closing-cylinder arrangement 8. In the preferred embodiment, the movable mould-part holder 6 comprises two parallel carrier plates 30, 31 which extend more particularly at right angles to the axis of motion 22 and are rigidly, preferably non-releasably, connected to one another via integrally-welded connecting members 28. The carrier plates 30, 31 have aligned guide openings for the rods 24.

As best shown in FIG. 2, the joint 18, which is disposed according to the invention between the piston-rod 14 and the mould-part carrier 6, preferably comprises a head 36 disposed or formed (integrally moulded) on the piston-rod 14, and a socket 38 which receives the head 36 and is connected, by screwing, with the carrier plate 30 of the mould-part holder 6 through an annular bearing plate 50. The head 36 has a cap-like bearing surface 42, at least on its side pointing in the closing direction (arrow 40) i.e. facing the stationary mould-part holder 4. The socket 38 has a correspondingly part-spherical cup-like bearing surface 44 so that, during motion in the closing direction 40, the bearing surface 42 of the head 36 comes to rest in the bearing surface 44 of the socket 38. Advantageously by this means, very large closing forces can be transmitted via the joint 18. In the example shown, the head 36, on its side remote from the bearing surface 42 in the axial direction, has a stepped surface 46 extending at right angles to the axis of motion 20 of the closing-cylinder arrangement 8, whereas the socket 38 has a stepped surface 48 which is axially opposite the part-spherical bearing surface 44 and is disposed at right angles to the axis of motion 22 of the movable mould-part holder 6. The stepped surfaces 46, 48 are separated by a clearance, i.e. a space, such that (hypothetically speaking) the closing-cylinder arrangement 8 and the movable mould-part holder 6 can be pivoted relative to one another through an angle of at least ±5°. In reality, pivoting is prevented by the guides, but the result of this inventive feature is that any lack of parallelism between the axes of motion 20 and 22 can be compensated up to an angle of at least ±5°, or can be present without adversely affecting the motion of the closing device 2 according to the invention. The axes of motion 20, 22 can therefore intersect at an angle of at least 5° or at most 175° (the supplement angle), the only result being that the joint 18 will take up a correspondingly pivoted position. The head 36 also rests with a radial peripheral clearance in the socket 38. This radial clearance, like the axial clearance between the stepped surfaces 46 and 48, is somewhat exaggerated in FIG. 2 for clarity. In reality this clearance is of the order of a few tenths of a millimeter.

We claim:

1. A device for closing an injection mould, comprising a first, stationary, mould-part holder, a second mould-part holder movably guided for relative movement with respect to the first holder, at least one pressure medium-actuated closing cylinder arrangement for moving the second holder, and pivotal connection means pivotably connecting the closing cylinder arrangement to the second holder, wherein the closing cylinder arrangement comprises a stationary cylinder and a closing piston therein, a piston rod connecting the piston to the movable second holder, and a joint connecting the piston rod to the movable second holder.

2. A closing device according to claim 1, wherein the joint comprises a head disposed on the piston rod and a socket receiving the head, there being a cap-shaped bearing surface on the head which rests in a correspondingly part-spherical bearing surface on the socket at least during motion in the closing direction.

3. A closing device according to claim 1, wherein the head, on its side remote from the cap-shaped bearing surface in the axial direction, has a stepped surface extending transversely to the axis of motion of the closing-cylinder arrangement, the stepped surface being opposite a stepped surface of the socket extending transversely to the axis of motion of the movable second holder and with an axial clearance such that non-parallelism between the axes of motion can be compensated up to an angle of at least ±5°.

4. A closing device according to claim 1, wherein the second holder is guided, substantially without tilting, on rods which are parallel to one another and to the axis of motion.

* * * * *